G. B. SINGELTARY.
Fertilizer.

No. 26,448

Patented Dec. 13, 1859.

Witnesses:
M. G. Ching
McM. G. Evans

Inventor:
G. B. Singeltary

UNITED STATES PATENT OFFICE.

G. B. SINGELTARY, OF GREENVILLE, NORTH CAROLINA.

IMPROVEMENT IN MANURE-DRILLS.

Specification forming part of Letters Patent No. 26,448, dated December 13, 1859.

*To all whom it may concern:*

Be it known that I, G. B. SINGELTARY, of Greenville, in the county of Pitt and State of North Carolina, have invented a new and Improved Manure-Drill; and I do hereby declare that the following is a full, clear, and exact description of the same, reference being had to the annexed drawings, making a part of this specification, in which—

Figure 1:
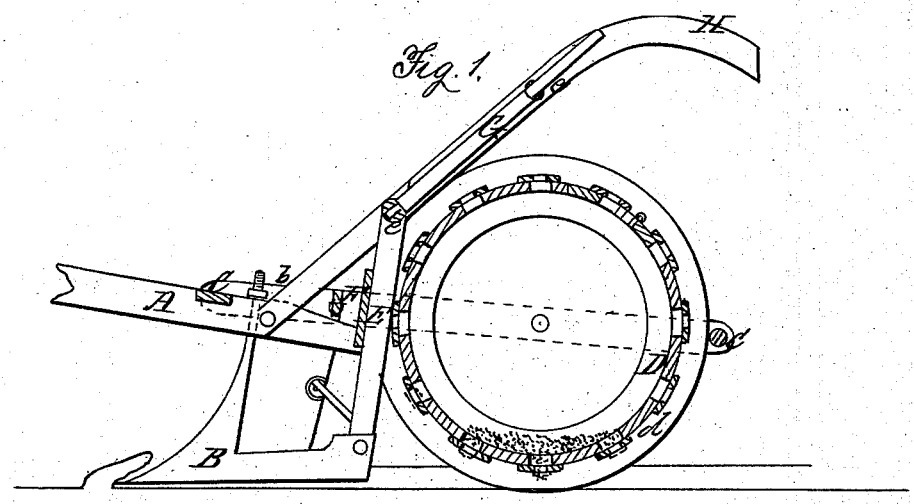
Figure 2:
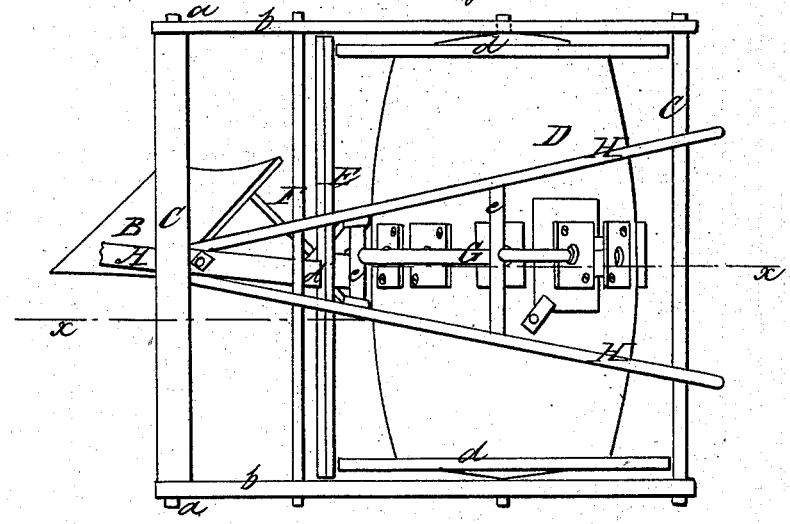

Figure 1 is a side sectional view of my invention, taken in the line $x\,x$, Fig. 2. Fig. 2 is a plan or top view of the same.

Similar letters of reference indicate corresponding parts in the two figures.

This invention is designed for sowing cotton-seed as a manure, either alone or mixed with guano or other fertilizer.

The invention consists in the employment or use of a bilge-shaped rotating hopper applied to a plow in a manner substantially as hereinafter shown and described, whereby the desired end is attained by a very simple and economical arrangement of means.

To enable those skilled in the art to fully understand and construct my invention, I will proceed to describe it.

A represents a plow-beam; B, the share, with a wing or mold-board attached. These parts are of usual construction, and therefore do not require a minute description, as they form a simple one-horse plow.

To the beam B a cross-bar, C, is attached permanently, said bar projecting out at equal distances from each side of the plow-beam, and having a tenon, $a$, at each end, on which a bar, $b$, is placed loosely. The bars $b\,b$ extend back some distance behind the plow, sufficiently so to receive the journals of a cask or bilge-shaped rotating hopper or manure-receptacle, D. The back ends of the bars $b\,b$ are connected by a cross-bar, $c$.

The hopper or manure receptacle D may be of any proper length—say thirty inches—and about twenty-one inches in diameter at the center of bilge, the ends $d$ being about two feet in diameter, so as to form wheels to rotate the receptacle. The receptacle is perforated with holes circumferentially at equal and suitable distances apart at the center of its bilge.

The share B is arranged in line, or as near so as may be, with the perforations of the receptacle D, and any lateral movement of the receptacle D is prevented by a stay guide-board, E, the center of which is notched and fitted on the beam A, as shown at $d'$, Fig. 2, the ends of board E just fitting within the bars $b\,b$. This board E, it will be seen, by being secured to the beam A at its back part and just in front of the receptacle, will keep the latter in a proper relative position with the plow. Between the two bars $b\,b$, and just in front of the guide-board E a bar, F, is fitted. This bar F of course crosses the beam A, but is not attached to it.

G is a bar which is secured in the cross-pieces $e\,e$ of the handles H H of the plow. This bar projects some distance above the upper cross-piece, $c$, as shown plainly in both figures.

The operation is as follows: As the machine is drawn along, the share B opens a furrow, and the manure which is in the hopper or receptacle D is distributed therein, the hopper or receptacle being rotated by the wheels or ends $d\,d$. When the distribution of manure is not required—as in passing over rocks or when an obstruction is in the path of the machine—the attendant grasps the cross-bar $c$ and elevates the receptacle. In case of turning the machine at the ends of rows, the attendant presses upward and forward the bar G, the plow bearing on its point, and the beam A, in consequence of it sback part rising and acting on the bar F, will raise the hopper or receptacle free from the ground. The implement thereby may be readily turned.

Having thus described my invention, I claim and desire to secure by Letters Patent—

The arrangement of the plow B, guide-board E, lifting-bar F, guiding-bar G, and rotating hopper or receptacle D, as and for the purposes herein shown and described.

G. B. SINGELTARY.

Witnesses:
 M. G. CHERRY,
 M. McG. ERROND.